(No Model.)
F. A. BROWNELL.
PHOTOGRAPHIC ROLL HOLDER SPOOL.
No. 554,769. Patented Feb. 18, 1896.
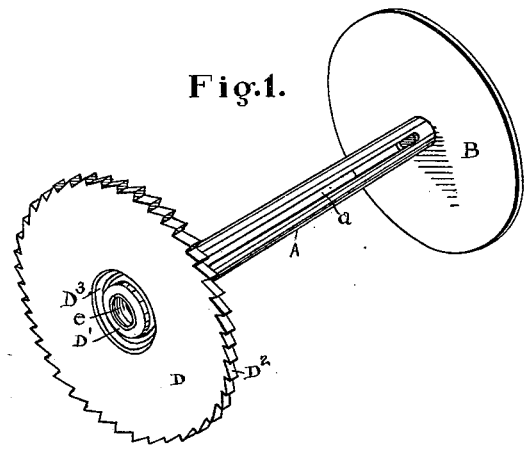
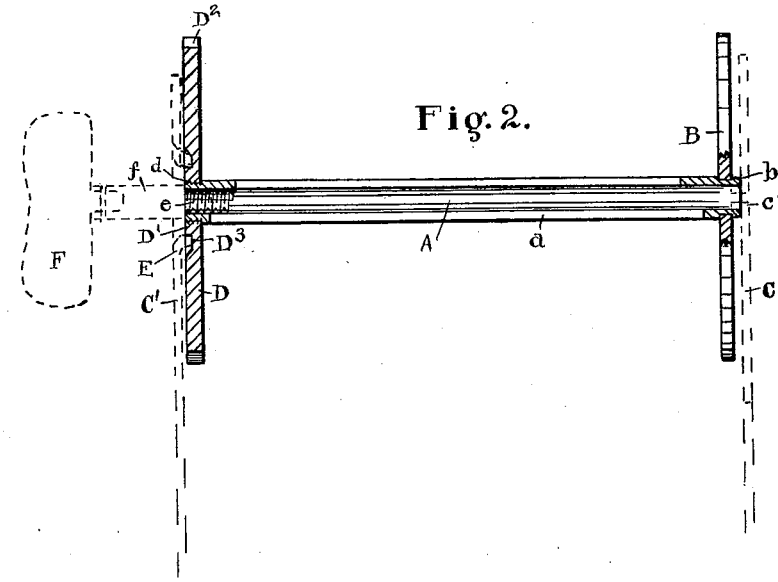
Witnesses:
Thomas Durant
A. M. Kelly
Inventor:
Frank A. Brownell,
by Church & Church
his atty's.

UNITED STATES PATENT OFFICE.

FRANK A. BROWNELL, OF ROCHESTER, NEW YORK, ASSIGNOR TO THE EASTMAN KODAK COMPANY, OF SAME PLACE.

PHOTOGRAPHIC ROLL-HOLDER SPOOL.

SPECIFICATION forming part of Letters Patent No. 554,769, dated February 18, 1896.

Application filed December 16, 1895. Serial No. 572,341. (No model.)

*To all whom it may concern:*

Be it known that I, FRANK A. BROWNELL, of Rochester, in the county of Monroe and State of New York, have invented certain new and useful Improvements in Spools or Rollers for Photographic Films; and I do hereby declare the following to be a full, clear, and exact description of the same, reference being had to the accompanying drawings, forming a part of this specification, and to the reference-letters marked thereon.

My present invention has for its object to provide an improved spool or roller for holding rolls of thin flexible photographic film, and is adapted particularly for use in photographic cameras; but it may of course be used for other material and other purposes; and it consists in a certain novel construction hereinafter described.

In the drawings, Figure 1 is a perspective view of a spool or roller constructed in accordance with my invention; Fig. 2, a longitudinal sectional view of the same, showing a support and operating means in dotted lines.

Similar reference-letters in the figures indicate similar parts.

A indicates the spindle or central arbor of the spool, constructed of a single piece of material, preferably of tubing, provided with the longitudinal slots $a$ on both sides, through which the end of the tape or ribbon may be passed to secure it to the spool. The ends of this spindle are reduced, and one of them is passed through the end flange or disk B and upset on the outside, as indicated by $b$ in Fig. 2, this upset portion projecting slightly beyond the side of the disk and forming a slight projecting collar to offer slight friction against a suitable supporting-arm C. (Indicated in dotted lines in Fig. 2.) The other reduced end of the spindle is provided with the exterior thread, $d$, and interior threads, $e$, and ratchet-disk D, provided with a central threaded aperture, is screwed upon the exterior thread, $d$, and up against the slight shoulder formed by reducing the end, and is preferably secured rigidly by soldering. The end of the spool is provided with the projecting hub D' on its outer side, having a bearing in a circular aperture formed in an arm or support C', preferably having an annular collar E around it, through which aperture is adapted to pass a removable thumb-screw F, having the reduced threaded end $f$ for entering the threaded end of the spindle. This screw is provided with a shoulder abutting against the end of the spindle and is an operating means for turning the spool and winding the film tape or ribbon thereon. The periphery of the disk D is provided with ratchet-teeth $D^2$, with which a pawl may co-operate to prevent backward rotation of the spool. The hub D' on the spool is preferably formed by cutting an annular groove $D^3$ in the face of the disk D, into which the collar E on the carrier projects, as this enables me to provide a disk of sufficient stiffness to carry the ratchet without increasing the length of the spool or spindle beyond the disk.

The outer end of the spindle, projecting beyond the disk B, offers but little frictional resistance to the rotation of the spool in the carrier-arms, and it is centered by a small projection $c'$ formed on one of them and entering the end of the spindle, while the collar E centers the spool at the other end, and the arm of the carrier, being slightly elastic, affords sufficient friction in the bottom of the groove in the face of the disk D to prevent accidental movement. By securing the ratchet-disk rigidly to the spindle at the end to which the operating-handle is connected and providing only a small friction-surface (the projecting end or collar $b$ of the spindle) at the opposite end I am enabled to draw the film-ribbon and hold it without unduly straining the spindle of the spool.

While the spool may be used for any purpose, it is particularly adapted for carrying photographic film in a camera—such as is illustrated in my application for Letters Patent Serial No. 548,983, filed May 11, 1895—the arms C C' shown therein, which are preferably elastic and pressing toward each other, forming part of the spool-carrier.

The spool shown and described herein is strong enough for all practical purposes, and is moreover very light, which is eminently desirable, as it is to be used in a hand photographic camera, and is also cheap and easily constructed.

Instead of making the spindle of a tube it is obvious that it may be made of a solid rod, the ends being bored and the slot formed in the central portion.

I claim as my invention—

1. The herein-described spool for film-ribbon having the slotted spindle and the flanges or disks at the ends, one of the ends of said spool being provided with the threaded recess, and the hub around it, and the other with the centering-aperture, substantially as described.

2. In the herein-described spool for film-ribbons, &c., the combination of the slotted spindle, having the threaded socket in one end, the flanges or disks secured to opposite ends of said spindle, one having the ratchet-teeth on its periphery, and the annular groove in its face, substantially as described.

3. In the herein-described spool for film-ribbons, &c., the combination of the slotted spindle having the reduced ends the disks secured on said reduced ends, one of said disks being provided with ratchet-teeth on its periphery, and the annular groove in its face, substantially as described.

4. In the herein-described spool for film-ribbons, &c., the combination of the hollow slotted spindle, having the reduced ends, one of which is threaded, and the threaded socket, the disk screwing on the threaded end having the ratchet-teeth, and the disk on the opposite reduced spindle end secured in place by flaring the said end outside the disk, substantially as described.

FRANK A. BROWNELL.

Witnesses:
F. F. CHURCH,
G. A. RODA.